United States Patent Office 3,282,918
Patented Nov. 1, 1966

3,282,918
2,7-DI-O-ACYLLINCOMYCINS, INTERMEDIATES, AND PROCESSES FOR PREPARING THEM
Herman Hoeksema, Cooper Township, Kalamazoo County, Robert D. Birkenmeyer, Comstock Township, Kalamazoo County, and Barney J. Magerlein, Portage, Mich., assignors to The Upjohn Company, Kalamazoo, Mich., a corporation of Delaware
No Drawing. Filed Apr. 13, 1964, Ser. No. 359,410
21 Claims. (Cl. 260—210)

This invention relates to novel derivatives of the antibiotic lincomycin and to processes for the preparation thereof, and is particularly directed to novel 2,7-di-O-acyl-lincomycins and to intermediates and processes for the preparation of the same.

Lincomycin is an antibiotic obtained as an elaboration product of a lincomycin-producing actinomycete. Methods for the production, recovery, and purification of lincomycin are described in U.S. Patent 3,086,912.

It has now been found that novel compounds according to this invention are obtained by first converting lincomycin to 3,4-O-isopropylidenelincomycin, acylating this compound to a 3,4-O-isopropylidenelincomycin 2,7-diacylate, and then removing the isopropylidene moiety to give a lincomycin 2,7-diacylate. Subsequent to this invention, the structure of lincomycin has been elucidated. The novel compounds of the invention, therefore, can now be represented by the following formula:

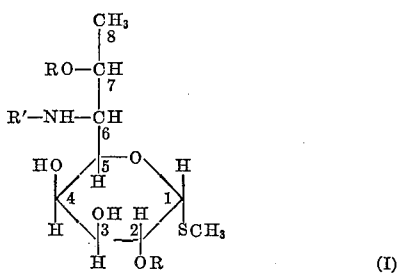

wherein R is a hydrocarbon carboxylic acid acyl radical of not more than 12 carbon atoms; or a halo-, nitro-, hydroxy-, amino-, cyano-, thiocyano-, and loweralkoxy-substituted hydrocarbon carboxylic acid acyl radical of not more than 12 carbon atoms; and R' is trans-4-propyl-L-hygroyl. Suitable hydrocarbon carboxylic acids include (a) saturated or unsaturated, straight or branched chain aliphatic carboxylic acids, for example, acetic, propionic, butyric, isobutyric, tertbutylacetic, valeric, isovaleric, caproic, caprylic, decanoic, dodecanoic, acrylic, crotonic, undecylanic, hexynoic, heptynoic, octynoic acids and the like; (b) saturated or unsaturated, substituted, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid and the like; (c) saturated or unsaturated, substituted, alicyclic aliphatic carboxylic acids, for example, cyclopentaneacetic acid, cyclopentanepropionic acid, cyclopenteneacetic acid, cyclohexanebutyric acid, methylcyclohexaneacetic acid and the like; (d) aromatic carboxylic acids, for example, benzoic acid, toluic acid, naphthoic acid, ethylbenzoic acid, isobutylbenzoic acid, methylbutylbenzoic acid and the like; and (e) aromatic-aliphatic carboxylic acids, for example, phenylacetic acid phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids of not more than twelve carbon atoms include hydrocarbon carboxylic acids as given above which are substituted by one or more of halogen, nitro, hydroxy, amino, cyano, or thiocyano, or loweralkoxy, advantageously loweralkoxy of not more than six carbon atoms, for example, methoxy, ethoxy, propoxy, butoxy, amyloxy, hexyloxy, and isomeric forms thereof. Examples of such substituted hydrocarbon carboxylic acids are mono-, di-, and tri-chloroacetic acid;
α- and β-chloropropionic acid;
α- and γ-bromobutyric acid;
α- and δ-iodovaleric acid;
mevalonic acid;
2- and 4-chlorocyclohexanecarboxylic acid;
shikimic acid;
2-nitro-1-methyl-cyclobutanecarboxylic acid;
1,2,3,4,5,6-hexachlorocyclohexanecarboxylic acid;
3-bromo-2-methylcyclohexanecarboxylic acid;
4 and 5-bromo-2-methylcyclohexanecarboxylic acid;
5 and 6-bromo-2-methylcyclohexanecarboxylic acid;
2,3-dibromo-2-methylcyclohexanecarboxylic acid;
2,5-dibromo-2-methylcyclohexanecarboxylic acid;
4,5-dibromo-2-methylcyclohexanecarboxylic acid;
5,6-dibromo-2-methylcyclohexanecarboxylic acid;
3-bromo-3-methylcyclohexanecarboxylic acid;
6-bromo-3-methylcyclohexanecarboxylic acid;
1,6-dibromo-3-methylcyclohexanecarboxylic acid;
2-bromo-4-methylcyclohexanecarboxylic acid;
1,2-dibromo-4-methylcyclohexanecarboxylic acid;
3-bromo-2,2,3-trimethylcyclopentanecarboxylic acid;
1-bromo-3,5-dimethylcyclohexanecarboxylic acid;
iophenoxic acid;
homogentisic acid;
o-, m-, and p-chlorobenzoic acid;
anisic acid;
salicylic acid;
p-hydroxybenzoic acid;
β-resorcylic acid;
gallic acid;
veratric acid;
trimethoxybenzoic acid;
trimethoxycinnamic acid;
4,4'-dichlorobenzilic acid;
o-, m-, and p-nitrobenzoic acid;
cyanoacetic acid;
3,4- and 3,5-dinitrobenzoic acid;
2,4,6-trinitrobenzoic acid;
thiocyanoacetic acid;
cyanopropionic acid;
lactic acid;
glycine;
ethoxyformic acid (ethyl hydrogen formate);
and the like The novel 2,7-diacylates of lincomycin can be used as antibacterial agents. For example, lincomycin 2,7-diacetate inhibits the growth of *Staphylococcus albus*, and, therefore, can be used as a disinfectant on various dental and medical equipment contaminated with this organism; it is also useful as a disinfectant on washed and stacked food utensils contaminated with this organism. Further, lincomycin 2,7-diacetate inhibits the growth of *Streptococcus virdans*, and, therefore, is useful for inhibiting this microorganism which has been found to be a contaminant on objects in dental offices, physicians' offices, and hospitals; it can also be administered in the feed or drinking water of laboratory animals such as mice and rats during shipment to act prophylactically in protecting them from *Streptococcus viridans* during shipment. The 2,7-dibenzoate has been shown to promote growth of chickens and is thus useful in chicken feed products.

The compound 3,4-O-isopropylidenelincomycin is useful as an intermediate for making the novel 2,7-diacylates of lincomycin. In this procedure, 3,4-O-isopropylidenelincomycin is first acylated to a 3,4-O-isopropylidenelincomycin 2,7-diacylate which is then subjected to mild acid hydrolysis to yield lincomycin 2,7-diacylate. In a similar manner, but using limited amounts of acylating agent, 3,4-O-isopropylidenelincomycin is useful as an intermediate for making lincomycin 2-acylates and lincomycin 7-acylates which are readily separated and purified by counter current distribution or partition chromatography.

The lincomycin 2- and 7-acylates and 2,7-diacylates produced by the process of the invention can be readily hydrolyzed to lincomycin and thus can be used to upgrade lincomycin.

In making lincomycin 2,7-diacylates lincomycin is first converted to 3,4-O-isopropylidenelincomycin by reacting lincomycin with acetone in the presence of an acid condensing agent such as p-toluenesulfonic acid, sulfuric acid, and hydrochloric acid. Advantageously, the reaction is conducted at room temperature using approximately 2 moles of acid catalyst for every mole of lincomycin. The product, which is initially obtained as a salt, can be readily converted to the free base by treatment with a base such as sodium hydroxide, or with a strong basic anion exchange resin. Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene cross-linked, if desired, with divinylbenzene prepared by the procedure given on page 84 of Kunin, supra, and quaternizing with trimethylamine or dimethylethanolamine by the procedure given on page 97 of Kunin, supra. Anion exchange resins of this type are marketed under the tradenames Dowex 2, Dowex 20, Amberlite IRA–400, Duolite A–102, and Permutit S–1.

The 3,4-O-isopropylidenelincomycin so obtained is reacted with an acid halide or anhydride of a selected hydrocarbon carboxylic acid in the presence of an acid-binding agent, for example, a tertiary amine to produce 2- and 7-monoacylates and 2,7-diacylates of 3,4-O-isopropylidenelincomycin. Suitable tertiary amines include heterocyclic amines such as pyridine, quinoline, and isoquinoline; trialkylamines such as trimethylamine, triethylamine, triisopropylamine and the like; N,N-dialkylanilines such as dimethylaniline, diethylaniline, and the like; and N-alkylpiperidines such as N-ethylpiperidine, N-methylpiperidine and the like. The preferred base is pyridine. The reaction is advantageously conducted by treating a suspension of 3,4-O-isopropylidenelincomycin in a tertiary amine with an acid halide or anhydride and heating the resulting mixture, if desired, for a short period at about 100° C. to complete the reaction. Water is added to the reaction mixture and the desired product is isolated by conventional procedures. Thus upon reacting 3,4-O-isopropylidenelincomycin in the presence of a tertiary amine with at least 2 moles of acylating agent, there is obtained a 3,4-O-isopropylidenelincomycin 2,7 - diacylate. When only 1 mole of acylating agent is used in the above reaction, there is obtained a mixture of 3,4-O-isopropylidenelincomycin 2-acylate and 7-acylate, along with some 2,7-diacylate.

The above described acylates can also be prepared in another manner. When 3,4-O-isopropylidenelincomycin is added to an equimolar amount of an acylating agent generated in situ, there is obtained a mixture of 3,4-O-isopropylidenelincomycin 2,7 - diacylate and the two monoacylates. For example, upon adding an equimolar amount of 3,4-O-isopropylidenelincomycin to the reaction product of 1,1'-carbonyldiimidazole and an acid in tetrahydrofuran there is obtained a mixture of 3,4 - O - isopropylidenelincomycin 2,7-diacylate, 2-acylate, and 7-acylate. When an excess of acylating agent is used, the above reaction will yield predominantly 3,4-O-isopropylidenelincomycin 2,7-diacylate. A mixture of the diacylate and monoacylate so obtained can be separated into its component parts by conventional procedures, for example, using counter current distribution procedures or using partition chromatography. In a preferred manner, the above-described mixture is resolved into the individual components by passing the mixture over a Florisil (a synthetic silicate of the type described in U.S. Patent 2,393,625 and sold by the Floridin Company) column and eluting gradiently with a Skellysolve B (isomeric hexanes): ethyl acetate:methanol combination in the proportions 90:10:0, 88.5:9:2.5, and 87:8:5.

The 3,4-O-isopropylidenelincomycin 2,7-diacylates and 2- and 7-monoacylates obtained by the above described procedures can be readily converted to lincomycin 2,7-diacylates and 2- and 7-monoacylates, respectively, by mild acid hydrolysis. For example, on hydrolyzing a 3,4-O-isopropylidenelincomycin 2,7-diacylate with 1 N hydrochloric acid the isopropylidene moiety is removed and lincomycin 2,7-diacylate is obtained as the hydrochloride. Similarly, hydrolysis of 3,4-O-isopropylidenelincomycin 2-acylates and 3,4-O-isopropylidenelincomycin 7-acylates yields lincomycin 2-acylates and lincomycin 7-acylates, respectively. Mixture of the two monoacylates can be hydrolyzed as can mixtures containing the two monoacylates and the diacylate. When mixtures are subjected to hydrolysis, mixtures of lincomycin acylates are produced and these can be separated into their components by procedures already described for the separation of the corresponding 3,4-O-isopropylidenelincomycin acylates. For the complete removal of the isopropylidene moiety it is advantageous to use a dilute mineral acid in the range .1 N to 1 N. A reaction temperature of 15–25° C. for about 1–5 hours is advantageously employed.

The compounds of the invention resemble lincomycin in their ability to form salts with acids. The sequence of the above reactions starting with lincomycin is shown as follows:

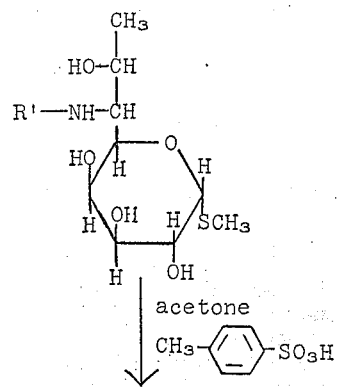

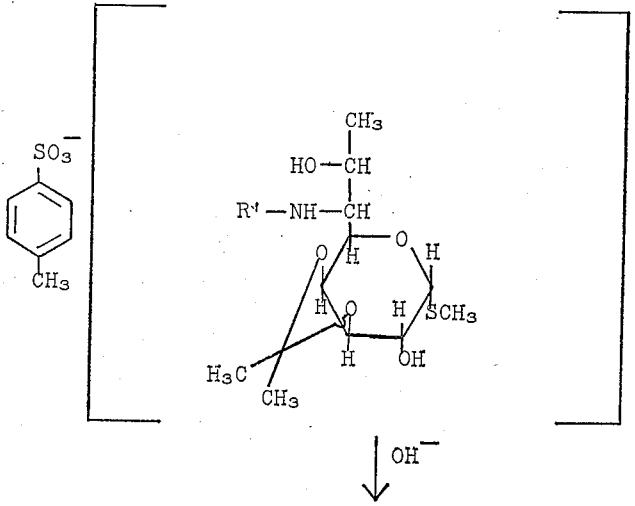
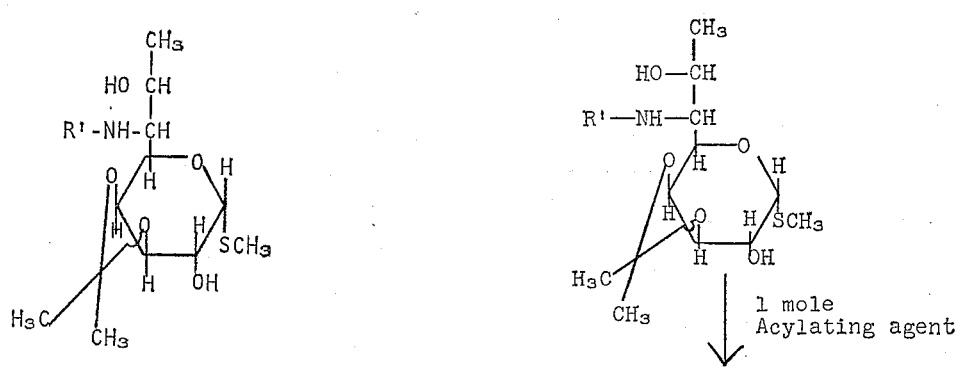
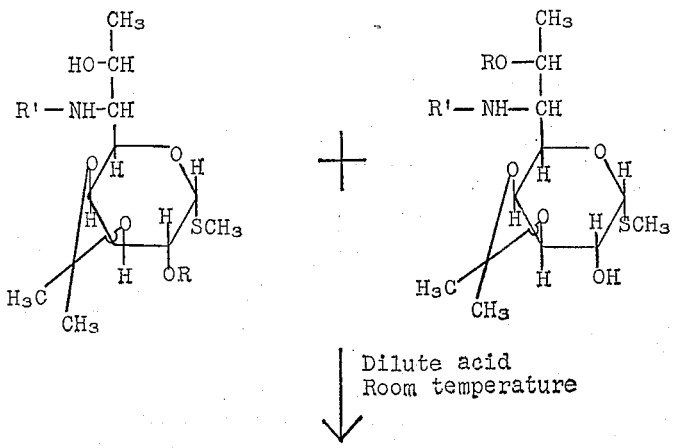
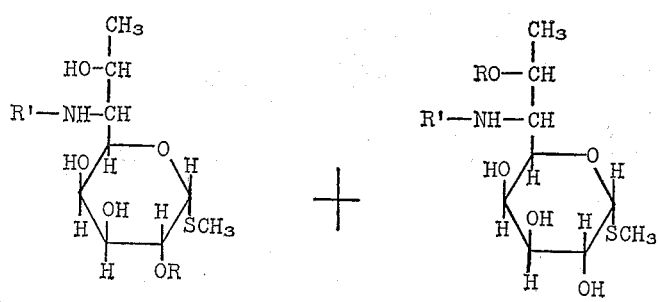

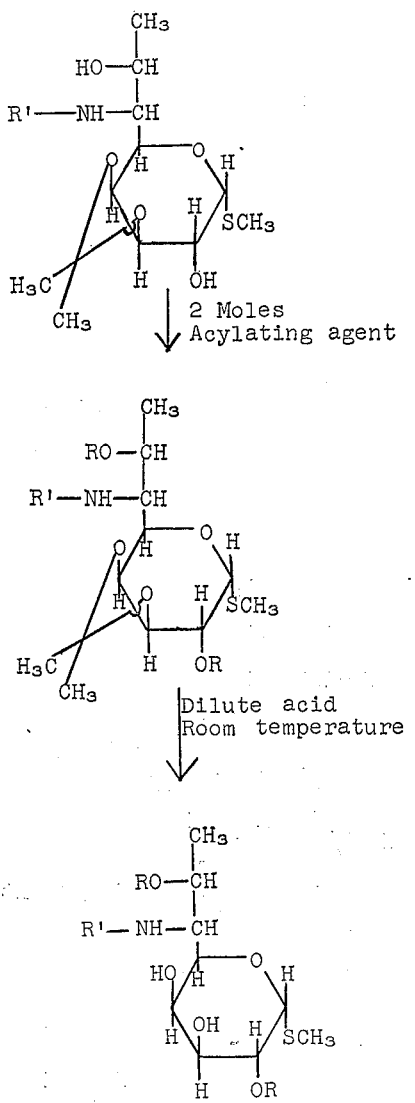

The following examples are illustrative of the process and products of the present invention but are not to be construed as limiting.

EXAMPLE 1

*Part A.—3,4-O-isopropylidenelincomycin*

A solution of 9.8 gm. of lincomycin in 150 ml. of acetone is added to a solution of 9.8 gm. of p-toluenesulfonic acid monohydrate in 100 ml. of acetone with good stirring and avoidance of exposure to moisture. The mixture is stirred at ambient temperature for 1 hour, after which 100 ml. of anhydrous ether is added and stirring is continued in an ice-bath for 0.5 hour. The mixture is filtered and the solid is dried in vacuo at 50° C.; yield 13.35 gm. (85.5%) of 3,4-O-isopropylidenelincomycin p-toluenesulfonate. An additional 1.15 g. (7.4%) can be recovered from the mother liquors by adding 350 ml. of anhydrous ether to the mother liquor from the previous filtering operation and chilling the solution for 1 hour. The 14.5 gm. so obtained are suspended in 200 ml. of ether and shaken vigorously with 125 ml. of 5% potassium bicarbonate solution. The aqueous layer is back-extracted with two 100-ml. portions of ether. The ether extracts are washed with 50 ml. of saturated sodium chloride solution and then filtered through anhydrous sodium sulfate. The ether is evaporated under vacuum, leaving 7.9 gm. (73.1%) of 3,4-O-isopropylidenelincomycin which is dissolved in 25 ml. of ethyl acetate and concentrated to about 10 to 15 ml. The concentrate is allowed to stand at room temperature for several hours and then refrigerated overnight. The crystals are filtered from the solution and washed sparingly with cold ethyl acetate; yield 4.55 gm. (42.2%) of 3,4-O-isopropylidenelincomycin having a melting point of 126–128° C., and an optical rotation of $[\alpha]_D^{25}+101–102°$ (c., 1., methylene chloride).

*Part B.—3,4-O-isopropylidenelincomycin 2,7-diacetate hydrochloride*

A solution of 2 gm. of 3,4-O-isopropylidenelincomycin and 1 ml. of acetic anhydride in 10 ml. of pyridine was heated 4 hours at 80° C. After standing overnight at room temperature, the reaction mixture was stirred 1 hour with 1 ml. of water, then evaporated to dryness under reduced pressure. The residue was dissolved in 20 ml. of ethyl acetate and the solution was washed with 1 volume of cold 5% sodium bicarbonate solution, then several times with 10-ml. portions of cold water, and evaporated to dryness under reduced pressure. The residue was dissolved in 100 ml. of ether to which was added gaseous dry hydrogen chloride until no further precipitate formed. The precipitate was stirred with ether and dried under vacuum to yield 800 mg. of 3,4-O-isopropylidenelincomycin 2,7-diacetate hydrochloride.

*Analysis.*—Calcd. for $C_{25}H_{42}N_2O_8S \cdot HCl \cdot H_2O$: C, 51.30; H, 7.75; Cl, 6.06; S, 5.48. Found: C, 51.61; H, 7.76; Cl, 6.37; S, 5.50.

*Part C.—Lincomycin 2,7-diacetate hydrochloride*

3,4-O-isopropylidenelincomycin 2,7 - diacetate hydrochloride (3.7 gm.) was dissolved in 25 ml. of water and sufficient 1 N hydrochloric acid was added to form a solution (pH 0.5) which was allowed to stand at room temperature for 5 hours. The solution was then freeze-dried and the residue was partially dissolved with ether, cooled and treated with excess dry hydrogen chloride. The precipitate was dissolved in chloroform, boiled to azeotropically distill traces of water, and the remaining chloroform solution was treated with ether to precipitate 3.9 gm. of material in two crops. This was further dried in vacuo to yield lincomycin 2,7-diacetate hydrochloride having a melting point of 141–146° C., an optical rotation of $[\alpha]_D^{25}=+118°$ (c., 1., water) and the following elemental analysis:

Calcd. for $C_{22}H_{38}N_2O_8S \cdot HCl$: C, 50.13; H, 7.45; N, 5.32; S, 6.08; Cl, 6.73. Found: C, 49.28; H, 7.66; N, 5.54; S, 5.80; Cl, 7.72.

*Part D.—Lincomycin 2,7-diacetate*

Upon treating lincomycin 2,7-diacetate hydrochloride with sodium hydroxide, lincomycin 2,7-diacetate is obtained. Also, upon treating lincomycin 2,7-diacetate hydrochloride with a strong basic anion exchange resin, as described previously, lincomycin 2,7-diacetate is obtained.

Lincomycin 2,7-diacetate has a distribution coefficient of $K=0.83$ in the system ethyl acetate:cyclohexane:95% ethanol:water (2.7:2.3:3.0:2.0).

Further, *S. aureus* infected mice were protected subcutaneously with a $CD_{50}$ of 32 (15–49) mg./kg. of lincomycin 2,7-diacetate.

Lincomycin 2,7-diacetate inhibited the growth of *Streptococcus viridans, Staphylococcus albus,* and *Staphylococcus aureus* in vitro.

EXAMPLE 2

*Lincomycin 2-acetate and 7-acetate*

To 10 mg. (0.022 mole) of 3,4-O-isopropylidenelincomycin in 100 ml. of pyridine at 5° C. was added 2.3 ml. (.023 mole) of acetic anhydride. The mixture was permitted to warm to room temperature and then stored overnight. After addition of 0.5 ml. of water, the solution was stirred ½ hour and then evaporated under high vacuum to dryness. The residue was dissolved in 100 ml. of ethyl acetate, and the solution was washed with 50 ml. of cold 5% sodium bicarbonate solution, 3 times with 50-ml. portions of water, dried over magnesium sulfate and evaporated to dryness, yielding 8.5 gm. of a mixture of 3,4-O-isopropylidenelincomycin monoacetates. The mixture was dissolved in 850 ml. of 0.025 N hydrochloric acid and stored at room temperature for 5 hours. The solution was adjusted to pH 7.3 by the addition of solid sodium bicarbonate and extracted 3 times with 100-ml. portions of ethyl acetate. The extract was washed twice with 50 ml. portions of water, dried over magnesium sulfate and evaporated to dryness, yielding 3.4 gm. of solid. A counter current distribution of this material in the system ethyl acetate, cyclohexane, 95% ethanol, water (2.7:2.3:3.0:2.0), showed the presence of two major components, $K=.27$ and $K=0.43$, which were isolated, identified as lincomycin mono-acetates and designated lincomycin acetate I and lincomycin acetate II. One of these, acetate I, is believed to be the 2-acetate, and the other, the 7-acetate.

In any event, one is the 2-acetate and the other is the 7-acetate.

Lincomycin acetate I and acetate II inhibited the growth of *S. aureus, S. albus,* and *S. lutea,* on a disc plate agar diffusion test. Lincomycin acetate I also inhibited the growth of *M. avium* in the above test.

*S. aureus* infected mice were protected subcutaneously with a $CD_{50}$ of 52 (28–76) mg./kg. of lincomycin acetate I and a $CD_{50}$ of 47 (35–59) mg./kg. of lincomycin acetate II.

EXAMPLE 3

*3,4-O-isopropylidenelincomycin 2-benzoate, 3,4-O-isopropylidenelincomycin 7-benzoate, and 3,4 - O - isopropylidenelincomycin 2,7-dibenzoate hydrochloride*

In a dry 1-liter flask were placed 800 ml. of dry tetrahydrofuran, 3.56 gm. (0.0262 mole) of benzoic acid and 4.25 gm. (0.0262 mole) of 1,1'-carbonyldiimidazole. When evolution of carbon dioxide had ceased (about 1 hour), 11.25 gm. (0.25 mole) of 3,4-O-isopropylidenelincomycin was added and the solution was heated at reflux for 18 hours under a nitrogen atmosphere. The resulting clear solution was evaporated under vacuum to remove the solvent and the viscous residue was dissolved in 300 ml. of methylene chloride, washed 3 times with 50-ml. portions of dilute sodium bicarbonate solution and twice with 50-ml. portions of water. The methylene chloride phase was filtered, evaporated to a volume of about 50 ml. and poured onto a column of 1900 gm. of Florisil (a synthetic silicate of the type described in U.S. Patent 2,393,625 and sold by the Floridin Company) in Skellysolve B (isomeric hexanes). The column was developed by gradiently mixing and eluting with the following solvent combinations (500 ml. fractions were collected):

| Fractions | Reservoir A | Reservoir B |
|---|---|---|
| | Skellysolve B:EtOAc:MeOH | Skellysolve B:EtOAc:MeOH |
| 1–20 | 90:10:0 | 88.5:9:2.5 |
| 21–40 | 88.5:9:2.5 | 87:8:5 |
| 41–63 | 87:8:5 | 87:8:5 |

All fractions were evaporated to dryness and the residue was analyzed by thin layer chromatography (on silica gel in an acetone:ethyl acetate system, 1:3). Fractions 33–36 yielded 2.5 gm. of 3,4-O-isopropylidenelincomycin 2,7-dibenzoate which was converted to the hydrochloride and recrystalized from 2-propanol-Skellysolve B; M.P. 224–226° C., optical rotation $[\alpha]_D^{25}+50°$ in ethanol (c.=0.609).

*Analysis.*—Calcd. for $C_{35}H_{46}N_2O_8S \cdot HCl$: C, 60.81; H, 6.85; N, 4.05; S, 4.64; Cl, 5.13. Found: C, 60.44; H, 7.36; N, 3.64; S, 5.00; Cl, 4.97.

Fractions 38–48 yielded 6.8 gm. of 3,4-O-isopropylidenelincomycin 2-benzoate which was recrystalized from ethyl acetate and Skellysolve B; M.P. 156–158° C., optical rotation $[\alpha]_D^{25}+96°$ in ethanol (c.=0.858).

*Analysis.*—Calcd. for $C_{28}H_{42}N_2O_7S$: C, 61.06; H, 7.69; N, 5.09, S, 5.82. Found: C, 60.80; H, 7.70; N, 5.08; S, 6.25.

Fractions 56–63 yielded 1.1 gm. of 3,4-O-isopropylidenelincomycin 7-benzoate which was recrystallized from ethyl acetate and Skellysolve B; M.P. 108–109° C., optical rotation $[\alpha]_D^{25}+52°$ in ethanol (c.=0.617).

*Analysis.*—Calcd. for $C_{28}H_{42}N_2O_7S$: C, 61.06; H, 7.69; N, 5.09; S, 5.82. Found: C, 61.09; H, 7.51; N, 4.80; S, 5.83.

On hydrolysis of 3,4-O-isopropylidenelincomycin 2-benzoate and 3,4-O-isopropylidenelincomycin 7-benzoate by the procedure of Example 1, Part C, lincomycin 2-benzoate and lincomycin 7-benzoate, respectively, are obtained.

EXAMPLE 4

*Lincomycin 2,7-dibenzoate hydrochloride*

In a 1-liter flask were placed 3.0 gm. of 3,4-O-isopropylidenelincomycin 2,7-dibenzoate, 100 ml. of methylene chloride and 200 ml. of 0.25 N hydrochloric acid. This mixture was stirred vigorously at 25° C. for 18 hours and then made basic with sodium bicarbonate solution. The methylene chloride phase was separated, filtered and evaporated under vacuum. The solid white residue, weighing about 3 gm., was dissolved in about 30 ml. of methylene chloride and poured onto a column of 300 gm. of Florisil in Skellysolve B. The column was developed by gradiently mixing and eluting with the following solvent combinations (300 ml. fractions were collected):

| Fractions | Reservoir A | Reservoir B |
|---|---|---|
| | Skellysolve B:EtOAc | Skellysolve B:EtOAc:MeOH |
| 1–20 | 90:10 | 87:8:5 |
| 21–40 | | 87:8:5 |

After evaporation of the solvents, the fractions were analyzed by thin layer chromatography (on silica gel in an acetone:ethyl acetate system, 1:3). Fractions 11–13 yielded 1.3 gm. of starting material and fractions 22–28 yielded 1.0 gm. of lincomycin 2,7-dibenzoate which was converted to the hydrochloride and recrystallized from ethanol; M.P. 220–222° C., optical rotation $[\alpha]_D^{25}+77°$ in ethanol (c.=0.824).

*Analysis.*—Calcd. for $C_{32}H_{42}N_2O_8S \cdot HCl$: C, 59.02; H, 6.66; N, 4.30; Cl, 5.45; S, 4.92. Found: C, 58.22; H, 6.78; N, 4.36; Cl, 5.62; S, 4.96.

EXAMPLE 5

Following the procedure of Example 1, Parts B, C, and D but substituting the acetic anhydride by acetyl chloride, propionyl bromide, butyryl chloride, valeryl chloride, caproyl chloride, heptanoyl chloride, caprylyl chloride, phenylacetyl chloride, toluyl chloride, cyclopentanepropionyl chloride, 1-cyclopentene-1-propionyl chloride, cyclohexaneacetyl chloride, acrylyl chloride, crotonyl chloride, 2-hexynoyl chloride, 2-octynoyl chloride, chloroacetyl bromide, p-chlorobenzoyl chloride, anisoyl chloride, salicyloyl bromide, p-nitrobenzoyl chloride, and cyanoacetyl chloride, and the pyridine by at least a stoichiometric amount of triethylamine there are obtained lincomycin 2,7-diacetate,
-2,7-dipropionate,
-2,7-dibutyrate, -2,7-divalerate,
-2,7-dicaproate,
-2,7-diheptanoate,
-2,7-dicaprylate,
-2,7-diphenylacetate,
-2,7-ditoluate,
-2,7-dicyclopentanepropionate,
-2,7-di-(1-cyclopenten-1-propionate),
-2,7-dicyclohexaneacetate,
-2,7-diacrylate,
-2,7-dicrotonate,
-2,7-di(2-hexynoate),
-2,7-di(2-octynoate),
-2,7-bis(chloroacetate),
-2,7-di-p-chlorobenzoate,
-2,7-dianisate,
-2,7-disalicylate,
-2,7-di-p-nitrobenzoate,
-2,7-dicyanoacetate,
and the hydrochlorides thereof.

EXAMPLE 6

Following the procedure of Example 1 but substituting the acetic anhydride of Part C by succinic, maleic, and phthalic anhydrides there are obtained lincomycin 2,7-bis(hydrogen succinate), -2,7-bis(hydrogen maleate), -2,7-bis(hydrogen phthalate) and the hydrochlorides thereof.

EXAMPLE 7

The corresponding lincomycin 2,7-diacylates are obtained by following the procedure of Example 1, Parts B, C and D where acetic anhydride in Example 1, Part B is substituted by acid halides or anhydrides of the following acids: cyclobutanecarboxylic acid, cyclopentanecarboxylic acid, $\Delta_3$-cyclopentenecarboxylic acid,
2-methyl $\Delta_3$ cyclopentenecarboxylic acid,
cyclohexanecarboxylic acid,
2,6-dimethyl $\Delta_3$ cyclohexenecarboxylic acid,
3,4-dipropylcyclohexanecarboxylic acid,
cyclopentaneacetic acid,
3-cyclopentylpropionic acid,
4-cyclohexylbutyric acid,
(2-methylcyclohexyl)acetic acid,
p-ethylbenzoic acid,
p-isobutylbenzoic acid,
3-methyl-4-butylbenzoic acid,
3-phenylpropionic acid,
5-phenylvaleric acid,
cinnamic acid,
3-phenylpropiolic acid,
(1-naphthyl)acetic acid,
mono-, di-, and tri-chloroacetic acid,
α and β-chloropropionic acid,
α and γ-bromobutyric acid,
α and δ-iodovaleric acid,
mevalonic acid,
2 and 4-chlorocyclohexanecarboxylic acid,
Shikimic acid,
2-nitro-1-methyl-cyclobutanecarboxylic acid,
1,2,3,4,5,6-hexachloro-cyclohexan-carboxylic acid,
3-bromo-2-methylcyclohexane carboxylic acid-(1),
4 and 5-bromo-2-methylcyclohexane carboxylic acid,
5 and 6-bromo-2-methyl-cyclohexane carboxylic acid-(1),
2,3-dibromo-2-methylcyclohexanecarboxylic acid,
2,5-dibromo-2-methylcyclohexanecarboxylic acid,
4,5-dibromo-2-methylcyclohexanecarboxylic acid,
5,6-dibromo-2-methylcyclohexane carboxylic acid,
3-bromo-3-methylcyclohexanecarboxylic acid,
6-bromo-3-methylcyclohexanecarboxylic acid,
1,6-dibromo-3-methylcyclohexanecarboxylic acid,
2-bromo-4-methylcyclohexanecarboxylic acid,
1,2-dibromo-4-methylcyclohexanecarboxylic acid,
3-bromo-2,2,3-trimethylcyclopentanecarboxylic acid,
1-bromo-3,5-dimethylcyclohexane carboxylic acid,
iophenoxic acid,
homogentisic acid,
o-, m-, and p-chlorobenzoic acid,
anisic acid,
salicyclic acid,
p-hydroxybenzoic acid,
β-resorcylic acid,
gallic acid,
veratric acid,
trimethoxybenzoic acid,
trimethoxycinnamic acid,
4,4-dichlorobenzilic acid,
o-, m-, and p-nitrobenzoic acid,
cyanoacetic acid,
3,4- and 3,5-dinitrobenzoic acid,
2,4,6-trinitrobenzoic acid,
thiocyanoacetic acid,
cyanopropionic acid,
lactic acid,
glycine,
ethoxyformic acid and (ethyl hydrogen formate),
and the like.

We claim:
1. A compound of the formula:

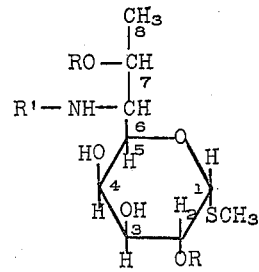

wherein R is selected from the group consisting of a carboxylic acid acyl radical of not more than 12 carbon atoms; or a halo-, nitro-, hydroxy-, amino-, cyano-, thiocyano-, and loweralkoxy-substituted hydrocarbon carboxylic acid acyl radical of not more than 12 carbon atoms; and wherein R' is trans-4-propyl-L-hygroyl.

2. Acid addition salts of the compounds of claim 1.
3. Lincomycin 2,7-dibenzoate hydrochloride.
4. Lincomycin 2,7-diacetate hydrochloride.
5. 3,4-O-isopropylidenelincomycin 2,7-diacylates, having the following structural formula:

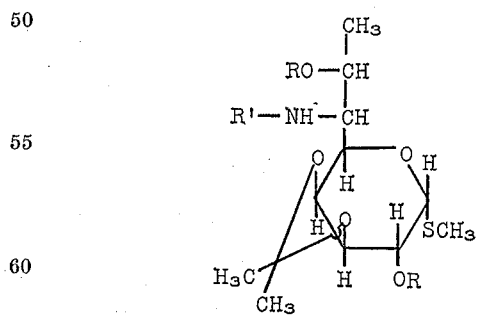

wherein R and R' are as defined in claim 1.
6. Acid addition salts of the compounds of claim 5.
7. 3,4-O-isopropylidenelincomycin 2,7-diacetate hydrochloride.
8. Lincomycin 2,7-diacylates wherein the acyl radical is that from a hydrocarbon carboxylic acid of not more than 12 carbon atoms.
9. 3,4-O-isopropylidenelincomycin 2,7-dibenzoate hydrochloride.
10. A process for producing 3,4-O-isopropylidenelincomycin 2,7-diacylates which comprises
(1) reacting a mixture of equimolar amounts of a carboxylic acid and 1,1'-carbonyldiimidazole in tetrahydrofuran until the evolution of carbon dioxide has ceased,
(2) adding an equimolar amount of 3,4-O-isopropylidenelincomycin to said mixture,
(3) heating said mixture at reflux for about 18 hours under a nitrogen atmosphere, and
(4) isolating the 3,4-O-isopropylidenelincomycin 2,7-diacylate so produced.

11. A process for producing lincomycin 2,7-dibenzoate hydrochloride which comprises hydrolyzing 3,4-O-isopropylidenelincomycin 2,7-dibenzoate with 0.25 N hydrochloric acid for about 18 hours at room temperature and isolating the lincomycin 2,7-dibenzoate hydrochloride so produced.

12. A process for producing the compounds of claim 8 which comprises hydrolyzing 3,4-O-isopropylidenelincomycin 2,7-diacylates with a dilute mineral acid in the range .1 N to 1 N at a reaction temperature of 15–25° C. for about 1 to 5 hours.

13. A process for making 3,4-O-isopropylidenelincomycin which comprises reacting lincomycin with acetone in the presence of p-toluenesulfonic acid.

14. A compound of the formula:

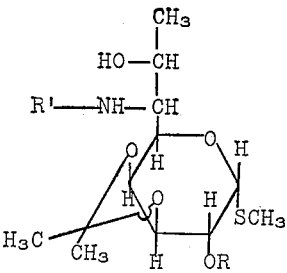

wherein R is selected from the group consisting of a carboxylic acid acyl radical of not more than 12 carbon atoms; a halo-, nitro-, hydroxy-, amino-, cyano-, thiocyano-, and loweralkoxy-substituted hydrocarbon carboxylic acid acyl radical of not more than 12 carbon atoms; and wherein R' is trans-4-propylhygroyl.

15. Acid addition salts of the compounds of claim 14.
16. A compound of the formula:

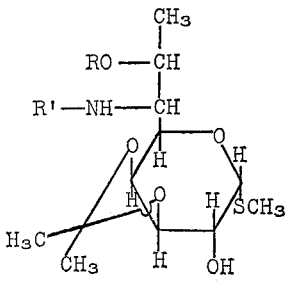

wherein R is selected from the group consisting of a hydrocarbon carboxylic acid acyl radical of not more than 12 carbon atoms; a halo-, nitro-, hydroxy-, amino-, cyano-, thiocyano-, and loweralkoxy-substituted hydrocarbon carboxylic acid acyl radical of not more than 12 carbon atoms; and wherein R' is trans-4-propyl-L-hygroyl.

17. 3,4-O-isopropylidenelincomycin 2-benzoate.
18. 3,4-O-isopropylidenelincomycin 7-benzoate.
19. 3,4-O-isopropylidenelincomycin p-toluenesulfonate having the following structural formula:

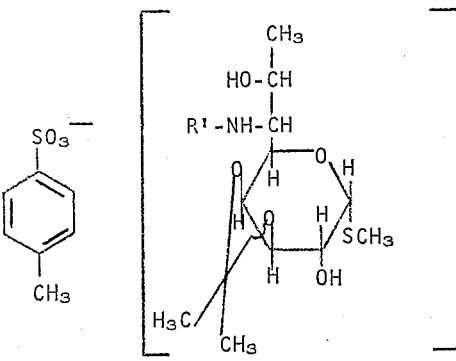

wherein R' is as defined in claim 1.

20. 3,4-O-isopropylidenelincomycin having the following structural formula:

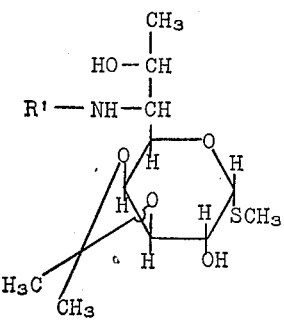

wherein R' is as defined in claim 1.
21. Acid addition salts of the compound of claim 20.

References Cited by the Examiner

Stanek et al.: "The Monosaccharides," 1963, Academic Press Inc., New York, N.Y., pp. 330–339.

LEWIS GOTTS, *Primary Examiner.*

J. R. BROWN, *Assistant Examiner.*